US008543808B2

(12) United States Patent
Ahmed

(10) Patent No.: US 8,543,808 B2
(45) Date of Patent: Sep. 24, 2013

(54) TRUSTED INTERMEDIARY FOR NETWORK DATA PROCESSING

(75) Inventor: Khaja E. Ahmed, Bellvue, WA (US)

(73) Assignee: Microsoft Corporation, Redmond, WA (US)

( * ) Notice: Subject to any disclaimer, the term of this patent is extended or adjusted under 35 U.S.C. 154(b) by 1293 days.

(21) Appl. No.: 11/509,476

(22) Filed: Aug. 24, 2006

(65) Prior Publication Data

US 2008/0052509 A1 Feb. 28, 2008

(51) Int. Cl.
*H04L 29/06* (2006.01)
*H04L 9/08* (2006.01)
*G06F 11/30* (2006.01)

(52) U.S. Cl.
USPC ............... 713/153; 713/156; 713/188; 726/1; 726/15; 726/24

(58) Field of Classification Search
USPC .................. 713/153, 156, 188; 726/1, 15, 24
See application file for complete search history.

(56) References Cited

U.S. PATENT DOCUMENTS

| | | | |
|---|---|---|---|
| 6,219,706 B1 * | 4/2001 | Fan et al. ....................... 709/225 |
| 6,393,568 B1 * | 5/2002 | Ranger et al. .................. 713/188 |
| 6,751,728 B1 * | 6/2004 | Gunter et al. .................. 713/153 |
| 6,886,103 B1 * | 4/2005 | Brustoloni et al. ............. 726/15 |
| 7,007,103 B2 | 2/2006 | Pinkerton et al. |
| 7,055,027 B1 * | 5/2006 | Gunter et al. .................. 713/151 |
| 7,069,438 B2 | 6/2006 | Balabine et al. |
| 7,073,066 B1 | 7/2006 | Nessett |
| 7,249,377 B1 * | 7/2007 | Lita et al. ........................ 726/12 |
| 7,543,146 B1 * | 6/2009 | Karandikar et al. ........... 713/175 |
| 7,735,139 B1 * | 6/2010 | Chou et al. ...................... 726/24 |
| 7,900,042 B2 * | 3/2011 | Hall et al. ....................... 713/160 |
| 8,130,768 B1 * | 3/2012 | Ahrens et al. .................. 370/401 |
| 8,185,947 B2 * | 5/2012 | Kurapati et al. ................ 726/15 |
| 2002/0083344 A1 * | 6/2002 | Vairavan ........................ 713/201 |
| 2002/0178026 A1 * | 11/2002 | Robertson et al. ................ 705/1 |
| 2003/0084003 A1 | 5/2003 | Pinkas et al. |
| 2003/0191843 A1 * | 10/2003 | Balissat et al. ................ 709/227 |
| 2003/0191963 A1 * | 10/2003 | Balissat et al. ................ 713/201 |
| 2003/0233475 A1 * | 12/2003 | Maufer et al. ................. 709/245 |

(Continued)

FOREIGN PATENT DOCUMENTS

EP 1259045 A2 * 11/2002

OTHER PUBLICATIONS

Phifer, Lisa. "The Trouble with NAT". The Internet Proto-col Journal, vol. 3, No. 4. Dec. 2000.*

(Continued)

*Primary Examiner* — Michael Simitoski
(74) *Attorney, Agent, or Firm* — Chin IP, PLLC; David Chin

(57) ABSTRACT

A networked computer system in which a trusted intermediary device is allowed access to packets transmitted through a secured connection. An endpoint to a secured connection identifies a trusted intermediary device, such as by certificate provided by the intermediary device or by using identification information provided by a trusted server. The endpoint shares with the trusted intermediary device connection information that enables the intermediary device to access packets transmitted through the secured connection. Using the connection information, the intermediary device may modify authenticated packets, such as to perform network address translation, without disrupting the underlying secured connection. Similarly, the intermediary device may use the security information to read encrypted information and perform functions such as network traffic monitoring or filtering of unwanted network traffic.

20 Claims, 6 Drawing Sheets

(56) References Cited

U.S. PATENT DOCUMENTS

| | | | |
|---|---|---|---|
| 2004/0005061 A1* | 1/2004 | Buer et al. | 380/282 |
| 2004/0015725 A1* | 1/2004 | Boneh et al. | 713/201 |
| 2004/0037284 A1 | 2/2004 | Bergek et al. | |
| 2004/0071149 A1* | 4/2004 | Kim et al. | 370/401 |
| 2004/0158706 A1 | 8/2004 | Moritomo et al. | |
| 2005/0066060 A1 | 3/2005 | Pinkerton et al. | |
| 2005/0132211 A1 | 6/2005 | Yunus et al. | |
| 2005/0198412 A1 | 9/2005 | Pedersen et al. | |
| 2006/0020787 A1 | 1/2006 | Choyi et al. | |
| 2006/0080546 A1* | 4/2006 | Brannon et al. | 713/185 |
| 2006/0104308 A1 | 5/2006 | Pinkerton et al. | |
| 2006/0143445 A1* | 6/2006 | Minnig et al. | 713/161 |
| 2006/0248575 A1* | 11/2006 | Levow et al. | 726/1 |
| 2006/0253908 A1* | 11/2006 | Yang | 726/24 |
| 2006/0256815 A1* | 11/2006 | Kivinen et al. | 370/466 |
| 2006/0288114 A1* | 12/2006 | Lu et al. | 709/231 |
| 2007/0169190 A1* | 7/2007 | Kolton et al. | 726/22 |
| 2007/0180227 A1* | 8/2007 | Akimoto | 713/153 |
| 2007/0260871 A1* | 11/2007 | Paya et al. | 713/151 |
| 2007/0288747 A1* | 12/2007 | Kwan et al. | 713/156 |
| 2008/0005791 A1* | 1/2008 | Gupta et al. | 726/15 |

OTHER PUBLICATIONS

Kasera, Sneha et al. "On Securely Enabling Intermediary-Based Services and Performance Enhancements for Wireless Mobile Users", Sep. 2003.*

Stallings, William. Network Security Essentials: Applications and Standards, 2000 Prentice-Hallm Inc., pp. 161-183.*

Georgiades, et al., "Security of Context Transfer in Future Wireless Communications," downloaded from http://www.ambient-networks.org/docs/Security of Context Transfer for Future%20_Mobile_ Communication.

Srisuresh, et al., "Middlebox Communication Architecture and Framework," Oct. 4, 2001, downloaded from http://tools.ietf.org/pdf/draft-ietf-midcom-fremework-or.pdf.

Zhang, "A Multilayer IP Security Protocol for TCP Performance Enhancement in Wireless Networks," IEEE Journal on Selected Areas in Communications.,vol. 22, No. 4., May 2004.

Nokia, "IP Clustering in IPSO FAQ," downloaded from http://www.gosecure.ca/english/files/IP_CLUSTERING_FAQ.pdf, dated Jun. 11, 2002, pp. 1-3.

Kivinen, "Running IKE Phase 2 over Artificial Kerberos IKE SA," Kerberized Internet Negotiation of Keys (kink), dated Nov. 16, 2000.

* cited by examiner

TRUSTED INTERMEDIARY FOR NETWORK DATA PROCESSING

BACKGROUND

Widespread availability of data networks has significantly altered the way people use computers for both personal and business purposes. Merchants, financial institutions and many other businesses make their computers available over data networks. People can access these computers for shopping, banking or transacting business of almost any type. Moreover, because these computers can be accessed over public networks, such as the Internet, people can perform these transactions from almost any place in the world. For example, people can work from home, connecting to office computers through a public network, such as the Internet.

However, the widespread availability of public networks, and ease of accessing information on them, has created security problems. Unauthorized users can gain access to information over the network, sometimes almost as easily as authorized users, creating a risk of misuse of a wide range of personal and business information.

Accordingly, sensitive information transmitted over public networks, such as the Internet, is frequently transmitted using secured connections. Secured connections are generally established using cryptographic processing to allow one or more authorized users to engage in certain functions involving an exchange of information. To create a secured connection, some form of cryptographic information, frequently including "keys," is used to apply a cryptographic function to messages transmitted over the network. The keys are provided only to users authorized to access information carried by the secured connection. Thus, even if unauthorized recipients can obtain messages as they are transmitted, only the users connected through the secured connection have the keys needed to perform the functions protected by the secured connection.

The specific functions protected by a secured connection may depend on the level of protection required. Secured connections frequently provide protection at the authentication level and/or the confidentiality level. For authentication, the keys may be used to apply a "signature" to a message that can only be duplicated by someone who has a key. The signature is generated by applying a cryptographic function to the message to generate a code, which is uniquely associated with the specific message and the specific key. A recipient may apply a cryptographic function to the message upon receipt to determine that the signature was generated using the specific key held by a specific authorized sender. Further, the recipient may verify that the message matches the signature, which allows the recipient to verify that the message was not altered after it was signed. In an authentication system, many users may be able to authenticate messages, but only users entrusted with keys can generate signatures.

If confidentiality is required, a key may be used to apply a cryptographic function to portions of the message that are to be maintained as confidential. The output of the cryptographic function is an encrypted message that can only be decrypted by an authorized recipient who has a key. The encrypted message is transmitted in place of the underlying unencrypted message. Though others may receive the encrypted message, only an authorized recipient with a key is able to decrypt it to access the underlying unencrypted message.

A drawback of using a secured connection is that network devices, even those that have a legitimate basis for accessing messages transmitted over the network, may be precluded from functioning. For example, routers that perform network address translation are precluded from operating on packets for which authentication is used because the translation of a network address in a message alters the message so that the signature no longer matches the message. Similarly, network monitoring devices are precluded from gathering statistics on encrypted packets because they cannot interpret what data is in the packets. Because of the disruption that secured connections can cause, adoption of certain security protocols has been hampered. For example, the IPsec protocol, though providing desirable attributes for security, has seen generally limited use because of its incompatibility with many network devices that have a legitimate need to access information conveyed over secured connections.

SUMMARY OF INVENTION

To allow networks to use both secured connections and provide functions that involve access to network traffic, a trusted intermediary device may be established between endpoints of a secured connection. The trusted intermediary device may be provided with security information about the secured connection, allowing it to decrypt, modify or otherwise access packets carrying information over the secured connection without disrupting secured communication between the endpoints.

To establish a device as a trusted intermediary, one more endpoints may provide the security information to the trusted intermediary. An endpoint may identify a trusted intermediary device based on information provided either from a trusted server or other trusted source or based on a certificate that may be provided by the intermediary device.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Network communication between two endpoints may be improved by allowing an intermediary device to access information transmitted as part of a secured connection between those devices. Once access to the information is available, the intermediary device may perform one or more processes not otherwise possible on information transmitted through a secured connection. For example, messages may be modified in transit for legitimate purposes, such as Network Address Translation or Port Address Translation, without interfering with communication through the secured connection. Alternatively or additionally, the intermediary device may use encrypted information in messages to improve network performance, such as by gathering statistics that can be used to tune the network or to more efficiently provide information in response to request, such as by supplying information from a cache. The information accessed also may be used to improve security, such as by checking for viruses or malicious code transmitted through the secured connection. However, the invention is not limited to these example uses and access to information transmitted over a secured connection may enable any suitable function.

To establish an intermediary device that can access network traffic transmitted through a secured connection, security information about the secured connection may be provided to an intermediary device that is trusted. Accordingly, embodiments of the invention may include identifying a trusted device. Though any suitable method to identify a trusted device may be used, an endpoint of the secured connection may identify a trusted device from information provided by an administrative server or from a certificate provided by the intermediary device or other source.

Figure 1:
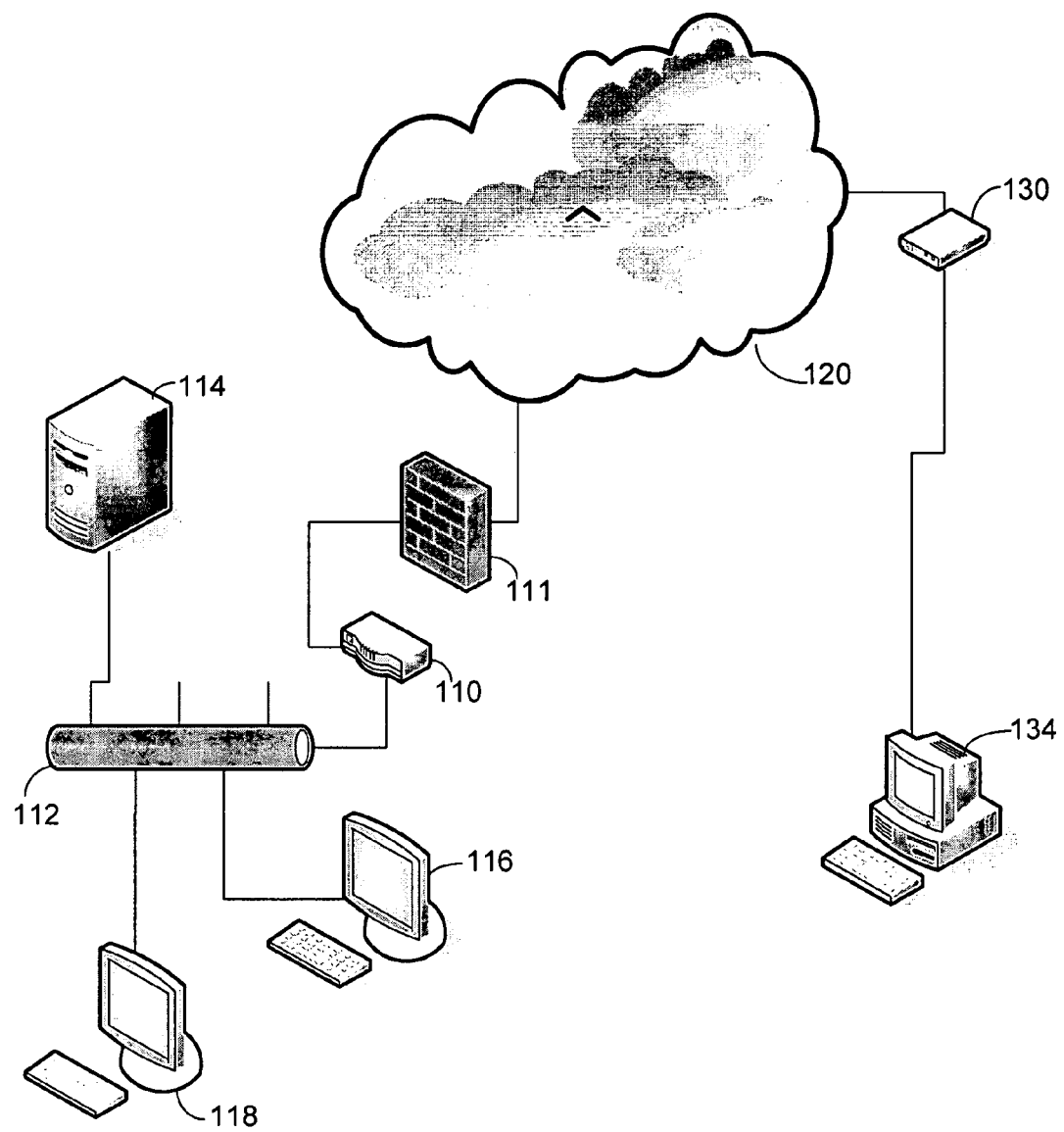
FIG. 1 is a sketch of a network in which a secured connection may be established with a trusted intermediary device according to an embodiment of the invention.

FIG. 1 illustrates a network in which a secured connection with a trusted intermediary device may be formed. Multiple devices are shown and a secured connection could be formed between any of the devices. Some devices are connected through a private network 112, such as may be operated by a company or other enterprise. In the example of FIG. 1, devices 116 and 118, illustrated as desktop computer workstations, are connected through private network 112. However, any number or type of device may be connected to private network 112 or any other suitable network.

FIG. 1 also shows a server 114 connected to private network 112. Server 114 may be any suitable server. In this example, server 114 is an administrative server, operated by a network administrator for private network 112. Server 114 may therefore provide information to devices, such as device 116 in a form approved by a network administrator. Such information may be "trusted" by an endpoint attached to private network 112.

Private network 112 may be any suitable network. In this example, private network 112 is illustrated as a local area network for simplicity. However, the invention may be employed within an organization with wide area networks or other large networks, and the size and topology of private network 112 is not a limitation of the invention.

Private network 112 is connected to public network 120 through a device, here shown as router 110. Router 110 may act as a gateway, passing network traffic between devices on private network 112 and public network 120. In addition, router 110 may perform other functions on network traffic, such as providing network address translation, port address translation, network traffic statistic gathering or other functions.

Private network 112 illustrates a network that may be operated by an enterprise or other organization that provides security for traffic on network 112 by restricting access to network 112 to only authorized users. Accordingly, communications between devices attached to private network 112 may be relatively secure. However, private network 112 is connected to public network 120, which may be the Internet. The connection to public network 120 may be used to connect any device on private network 112 to other devices that can access public network 120. In this example, device 134 is shown connected to public network 120 through modem 130. Accordingly, device 132 may establish a connection with any of the devices on private network 112.

Opening private network 112 to any device that can access public network 120 creates a security risk for network 112. For example, unauthorized users may obtain and misuse information. Alternatively, unauthorized users may send commands or other information that damages operation of private network 112.

To combat these security risks, a network administrator may impose security policies that restrict access to private network 112. Secured connections may be a part of these security policies. For example, a network administrator may incorporate a firewall 111 or other protective device that precludes access to private network 112 by devices outside private network 112 unless a secured connection is established to a device within private network 112. Such a secured connection may require authentication to ensure that only authorized users access private network 112. A secured connection that can pass through firewall 111 may alternatively or additionally require encryption to prevent secret information on private network 112 from being obtained as communications between a device within private network 112 and a device outside private network 112 are routed through public network 120.

In this example, router 110 and firewall 111 are shown as separate devices. However, any suitable implementation of the components of private network 112 may be used, including implementing a firewall within router 110 or other gateway device.

Frequently, enterprises employ virtual private networks (VPNs) to provide secured connections when allowing devices to connect to private networks through a public network 120. Many VPNs are formed using a communication protocol known as IPsec. In some embodiments described herein, IPsec is used as an example of a protocol for a secured connection. However, the specific communication protocol is not a limitation of the invention and any suitable protocol establishing a secured connection may be used.

The IPsec protocol may be used in a mode that allows authentication of message traffic between endpoints of a secured connection. Alternatively or additionally, the IPsec protocol may be used to provide confidentiality by encrypting messages between endpoints of a secured connection. The invention may be employed with a secured connection using any level of security, whether to provide authentication, confidentiality, authentication and confidentiality or any other level.

In the embodiment of FIG. 1, a secured connection is formed between a device on private network 112, such as device 116, and a device connected to private network 112 through public network 120. In this example, a connection is established between device 116 and device 134. As part of that connection, messages may be communicated as a series of one or more packets communicated between device 116 and device 134. Those packets may pass through multiple intermediary devices on the path between device 116 and 134. Intermediary devices such as router 110, firewall 111 and modem 130 are illustrated in FIG. 1.

A network connection between devices 116 and 134 may contain multiple additional intermediary devices, which are not shown for simplicity. For example, device 134 may also be connected to a private network that is in turn connected to public network 120 through a router and a firewall. Accordingly, the invention is not limited by the number or types of intermediary devices in the path between the endpoints of a connection.

In some instances, even if the connection between devices 116 and 134 is formed as a secured connection, it may be desirable to allow one or more intermediary devices to access messages transmitted over that connection without disrupting communications through the underlying secured connection. Access may entail modifying an authenticated packet, reading encrypted information in a packet or otherwise performing a function on or in response to messages transmitted through a secured connection that is normally restricted to authorized endpoints of the connection.

To facilitate access to messages transmitted through the secured connection, in some embodiments, one or more of the intermediary devices in the path between device 116 and device 134 may be a trusted device that is provided security information that can be used to access messages transmitted over the secured connection between devices 116 and 134. In some embodiments, the security information used by the intermediary device to access packets transmitted over the secured connection may be provided by one or more of the endpoints to the connection. However, before providing security information, the endpoint may ascertain that the intermediary device is trusted.

In the example of FIG. 1, router 110 acts as a trusted device and is provided security information by device 116. Device 116 may determine that router 110 is a trusted device based on information obtained in any suitable way. In some embodiments, information identifying trusted devices is provided by an administrative server within private network 112.

In the example of FIG. 1, server 114 is an administrative server on private network 112. Information provided by server 114 may be trusted by devices connected to private network 112. In this example, server 114 may provide information identifying a trusted device that may be used as an intermediary in a secured connection in which any device on private network 112 is an endpoint. Because administrative server 114 is maintained by a network administrator, it can be programmed to use network information to identify an intermediary device that processes messages to or from any device on private network 112. Further, administrative server 114 may be programmed to identify which of those intermediary devices may be trusted. A device may be trusted based on its position (i.e., within a private network), based on its construction (i.e., with security measures that prevent unauthorized access to the device) or based on any other suitable criteria.

In the specific example shown, router 110 has been identified as a trusted device that is positioned as an intermediary. Any message between a device outside of private network 112 may pass through router 110. Also, router 110 may be maintained by an administrator for network 112, making it trusted. Accordingly, when a device within private network 112, such as device 116 establishes a secured connection with device 134, router 110 may act as a trusted intermediary device.

Figure 2:
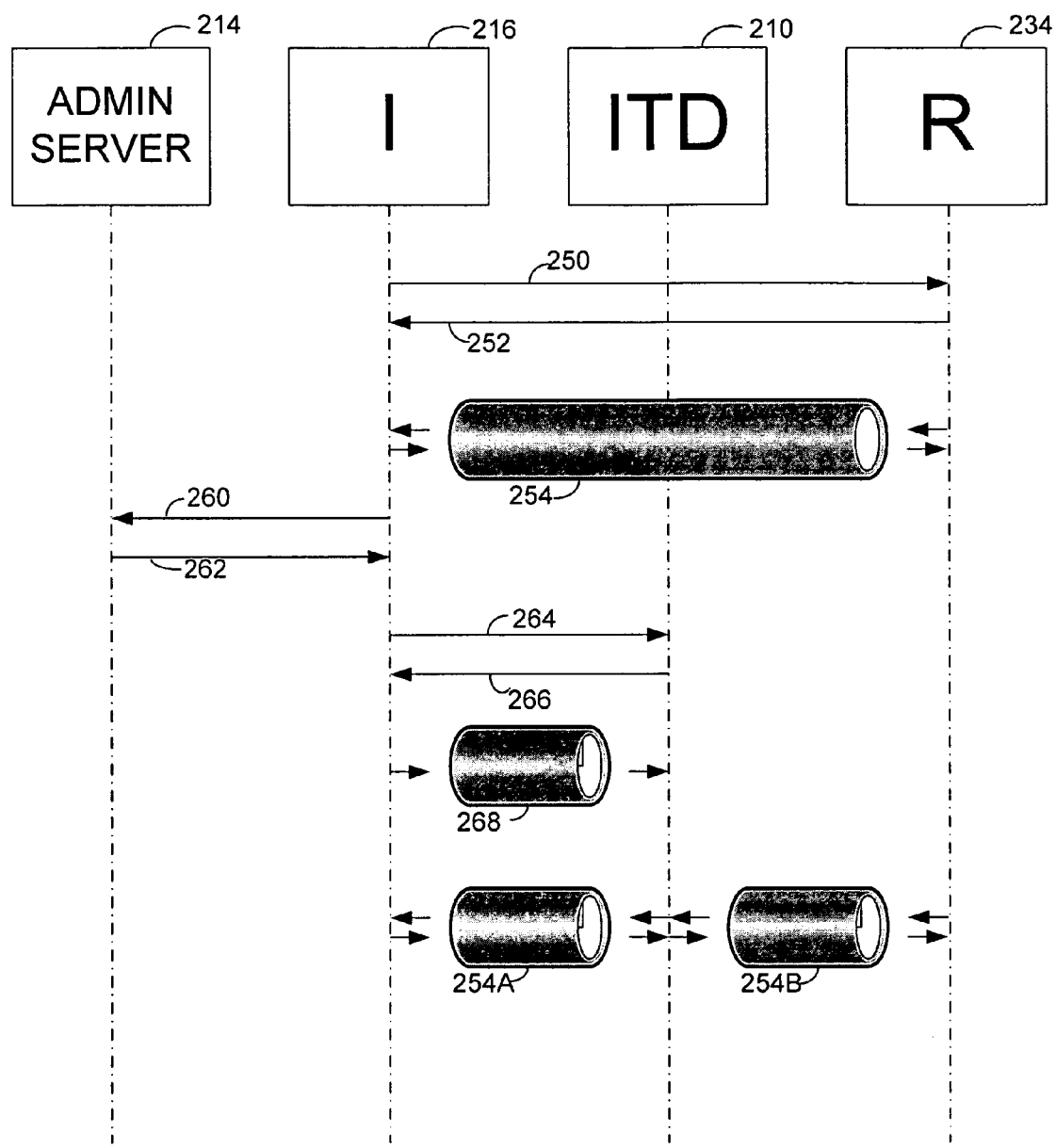
FIG. 2 is a sketch illustrating steps in a process of establishing a device as a trusted intermediary according to an embodiment of the invention.

FIG. 2 illustrates a process by which a secured connection may be formed with a trusted intermediary device between two endpoints of a secured connection. In the illustrations herein, endpoints are shown as computing devices. While endpoints may be contained within computing devices, it is not a limitation of the invention that an endpoint be an entire device. An endpoint may be an application or operating system component within a device. It may also be an aggregation of devices behaving as one and sharing the necessary state information. For simplicity, each endpoint is illustrated as a device, but the makeup of an endpoint is not a limitation of the invention.

In the embodiment of FIG. 2, a secured connection is initiated by a device that will be an endpoint in the secured connection. Such a device is represented as initiator device 216, which initiates a secured connection with responder device 234. In the example of FIG. 1, device 116 may initiate a connection to device 134 or vice versa, though any suitable devices may act as endpoints of the secured connection and the connection may be established in any suitable way.

In the example of FIG. 2, communication 250 is illustrated as initiating an exchange of information that establishes a secured connection. Communication 250 passes through intermediary device 210. However, intermediary device 210 may play no role in initially forming a secured connection between initiator device 216 and responder device 234 other than, in the illustrated embodiment, conveying messages along the network path between initiator device 216 and responder device 234.

In response to communication 250, responder device sends communication 252 to initiator device 216. The content of communications 250 and 252 may be in any suitable form. In the example in which a secured connection between initiator device 216 and responder device 234 is formed using the IPsec protocol, communications 250 and 252 may follow the Internet Key Exchange (IKE) protocol as specified in RFC 4306 issued by the Internet Engineering Task Force (IETF). Such a protocol may involve multiple exchanges of network packets to establish a secured connection. For simplicity, FIG. 2 shows a single communication 250 from initiator 216 to responder device 234 and a single communication 252 from responder device 234 to initiator device 216. However, any number of packets, messages or other exchanges of information may be used to establish a secured connection and the number and type of the exchanges of information may depend on the protocol used to form the secured communication.

The result of communications 250 and 252 is that initiator device 216 and responder device 234 exchange security information that establishes a secure connection. The specific security information exchanged may depend on the protocol used for the secured connection and the level of security desired. Such security information may include one or more keys that initiator device 216 may use to encrypt information transmitted to responder device 234 and to decrypt information received from responder device 234. Likewise, as a result of communications 250 and 252, responder device 234 may obtain keys used to protect information communicated to initiator device 216 and to access information received from initiator device 216. The devices may use the same or different keys to encrypt and decrypt messages, depending on the specific protocol and policies or algorithms for access of information within that protocol.

A secured connection may provide for a one-way or a two-way exchange of secured information. For example, the result of communications 250 and 252 may be that initiator device 216 and responder device 234 have security information to allow secured communication to pass in both directions between initiation device 216 and responder device 234, or only from initiator 216 to responder 234, or vice versa. Though the embodiments used as examples herein provide two-way secured communication, the invention is not limited in that respect.

Regardless of the specific security information that establishes a secured connection, once the secured connection is established, initiator device 216 and responder device 234 may communicate through secured connection 254. Secured connection 254 is sometimes described as a "secure pipe" because information provided at one end is cryptographically protected until it reaches the other end. The level of protection provided by secured connection 254, and therefore and steps taken by each of the endpoint devices to transmit or access information communicated through secured connection 254, may depend on the specific protocol used to implement secured connection 254 and/or the level of protection desired. For example, if secured connection 254 is intended to provide confidentiality for communications between initiator device 216 and responder device 234, access to communications may entail decrypting received communications. Alternatively, if secured connection 254 provides authentication only, access to communications may involve only authenticating that the communication was signed by another authorized endpoint to secured connection 254 and was not subsequently modified.

In the embodiments described herein, communications are in the form of a stream of packets. Security information may be applied to authenticate or encrypt each packet individually. Such a format of information is consistent with the IPsec protocol. However, the invention is not limited to this protocol or to packet-by-packet security and any suitable format of messages may be used to communicate through secured connection 254 and any suitable mechanism may be used to secure those messages.

Though packets transmitted through secured connection 254 may pass through intermediary device 210, intermediary device 210 is unable, initially, to access those packets. Intermediary device 210, for example, may be limited to receiving and forwarding packets based on header information that is not encrypted. To enable intermediary device 210 to access the packets conveyed through secured connection 254, intermediary device 210 is provided with security information that enables it to access the packets. In some embodiments, that security information is provided by one of the endpoints to the secured connection. In the embodiment of FIG. 2, initiator device 216 provides the security information to intermediary device 210.

In embodiments in which security information is provided by one endpoint of a secured connection, the other endpoints may be unaware that a trusted intermediary device has been established. Further, though FIG. 2 shows a single trusted intermediary device being established by one endpoint, embodiments are possible in which two or more endpoints of a secured connection each establish a trusted intermediary device.

Regardless of the number of trusted intermediary devices established, prior to providing security information to intermediary device 210, an endpoint may determine that intermediary device 210 is trusted. In this context, a device may be trusted if one or both of the operators of the devices on which the endpoints of the secured connection 254 are formed deem that allowing a device access to information conveyed through secured communication 254 is acceptable. Therefore, allowing an intermediary device access is likely to be acceptable when access would not defeat the purpose of using a secured connection. For example, a device may be trusted if it has security mechanisms that prevent unauthorized parties from reading information stored on the device or prevent others from injecting unauthorized messages through the device. Though, any suitable method of defining a trusted device may be used.

A decision to trust a device may be made directly or indirectly. For example, a human user of an endpoint device may enter information through a user interface directly specifying a trusted device. As another example, a decision to trust a particular device may be made indirectly based on information or policies established by a network administrator for a network domain in which one of the endpoints resides. Such trust decisions may be retrievable from servers on the network or may be distributed to all clients on the network as a matter of routine policy distribution, or may be obtained in any other suitable way.

In the embodiment pictured in FIG. 2, information on trust of an intermediary device is provided by an administrative server 214. In this example, administrative server 214 is a server managed by a network administrator in a network domain in which initiator device 216 resides. Administrative server 214 may be any suitable server to which initiator device 216 has access. For example, administrative server 214 may be an active directory server. However, in other embodiments, administrative server 214 may be a DNS server or any other suitable server that initiator device 216 regards as a trusted source of information.

Accordingly, FIG. 2 shows initiator device 216 sending communication 260 to administrative server 214. Communication 260 requests information from administrative server 214 that will identify one or more trusted intermediary devices. Administrative server 214 responds with communication 262 identifying a trusted intermediary device. The information provided in communication 262 may be in any suitable form. Such information may include a name or network address for a trusted intermediary device. In addition, information in communication 262 may include a key, a certificate or other information that initiator device 216 may use to establish communication with intermediary device 210. As with other communications illustrated in the figures, communications 260 and 262 are shown as a single event for simplicity of illustration, but each communication may involve an exchange of multiple packets or messages or multiple other events.

Once initiator device 216 has information identifying intermediary device 210 as a trusted intermediary device, initiator device 216 then begins the process of conveying security information to intermediary device 210. In embodiments in which initiator device 216 and intermediary device 210 are connected to the same private network that provides secure communications between devices, initiator device 216 may transmit security information directly to intermediary device 210. However, in embodiments in which initiator device 216 and intermediary device 220 are not connected by a secured network, it may be desirable to establish a secured connection between initiator device 216 and intermediary device 210 to avoid compromising secured connection 254 by making security information about the connection available in an insecure way. Accordingly, FIG. 2 shows communications 264 and 266, representing an exchange of information between initiator device 216 and intermediary device 210. Communications 264 and 266 may provide information necessary to establish a further secure connection between initiator device 216 and intermediary device 210. In some embodiments, communications 264 and 266 may be in the same format as communications 250 and 252. For example, communications 264 and 266 may represent an exchange of information according to the IKE protocol.

Regardless of the specific protocol used for communications 264 and 266, the result of those communications is a secured connection 268 between initiator device 216 and intermediary device 210. Secured connection 268 may be in the same form as secured connection 254. Secured connection 268 alternatively may be a one-way secured connection, protecting information sent from initiator device 216 to intermediary device 210. However, any suitable connection may be used.

Initiator device 216 uses secured connection 268 to convey security information about secured connection 254. The security information allows intermediary device 210 to access packets communicated through secured connection 254 as they pass through intermediary device 210. The specific information communicated through secured connection 268 may depend on the nature of secured connection 254. Examples of information that may be communicated through secured connection 268 include keys used to encrypt or decrypt information in a message or to sign or authenticate messages. Additionally, the security information may include an identification of the cryptographic algorithms used in protecting information communicated through secured connection 254. Other aspects of the security information may identify policies used by the endpoint devices communicating through secured connection 254 and the state of the connection at the time security information is provided. More generally, security information may include any information necessary or desirable to allow intermediary device 210 to recognize or access packets that are conveyed through secured connection 254.

Thereafter, secured connection 254 may be treated as if it has two segments, 254A and 254B. Though the endpoints to secured connection 254 may continue to send and receive packets through secured connection 254, intermediary device 210 may access those packets at the junction between segments 254A and 254B. As part of this access, intermediary device 210 may use information in the packets without modification or may modify the packets and forward the modified packet in place of the original packet. In modifying a packet, intermediary device 210 may use the security information it has about secured connection 254 to reformat the modified packet in accordance with the protocol used on secured connection 254 so that the recipient endpoint accepts the modified packet as a legitimate packet transmitted through secured connection 254. In this way, intermediary device 210 may perform a range of functions involving access to secured network traffic without disrupting communication through secured connection 254.

Figure 3:
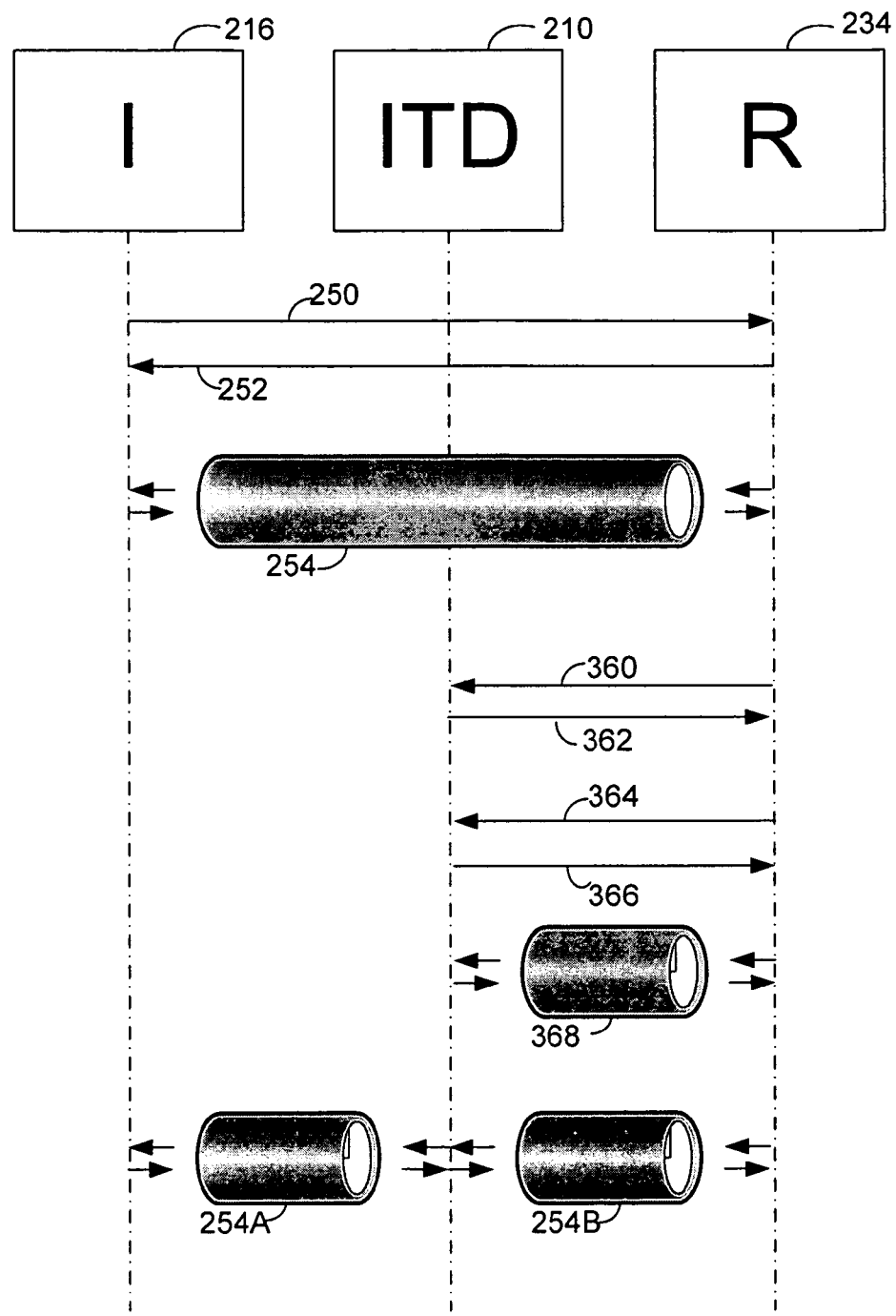
FIG. 3 is a sketch showing steps in a process of establishing a device as a trusted intermediary according an alternative embodiment of the invention.

FIG. 3 shows an alternative embodiment in which trusted intermediary device is established. As in the embodiment of FIG. 2, initiator device 216 and responder device 234 are endpoints of a secured connection. They use communications 250 and 252 to establish a secured connection 254. Intermediary device 210 is a device in the path that carries packets through secured connection 254.

In the embodiment of FIG. 3, however, responder device 234 provides security information to intermediary device 210. Before doing so, responder device 234 determines that intermediary device 210 is a trusted device.

In this embodiment, responder device 234 determines that intermediary device 210 is trusted based on information provided by intermediary device 210. Accordingly, FIG. 3 shows responder device 234 sending communication 360 requesting information identifying trusted devices. Communication 360 may be in any suitable form and may be addressed directly to intermediary device 210 or may more generally be directed to any device on the path between responder device 234 and initiator device 216. For example, communication 360 may be a DNS query or may be transmitted in accordance with a broadcast protocol, such as Web Service Discovery (WSD).

Regardless of the specific format of communication 360, initiator device 210 responds with communication 362. In this embodiment, communication 362 contains information identifying intermediary device 210 as a trusted device. In some embodiments, communication 362 may contain a certificate identifying intermediary device 210 as a trusted intermediary device. Such a certificate may be in any suitable form and may allow responder device 234 to authenticate that intermediary device 210 has been certified as a trusted device. The certificate may include an address for intermediary device 210 as well as class information about intermediary device 210 identifying it as a device that can act as an intermediary trusted device.

As one example, communication 362 may convey a certificate in accordance with X.509. Such a certificate may identify intermediary device 210 and may include an extension identifying it as a device that may serve as a trusted intermediary device. However, any other suitable format may be used to identify a trusted intermediary device to responder 234 and the specific format of communication 262 is not a limitation of the invention.

In this example, responder 234 is shown receiving a single communication from a device that becomes a trusted intermediary. Though not shown for simplicity, responder device 234 may receive multiple responses if communication 360 is a broadcast type message. If responder 234 receives multiple responses from devices that qualify as trusted intermediary devices, it may select the most appropriate device based on any suitable criteria. If responder 234 receives responses from devices that are not trusted intermediaries, responder device 234 may simply ignore them or process them in any other suitable way.

Regardless of how responder 234 identifies an intermediary device that is trusted, responder 234 may then establish a security connection with intermediary device 210 so that responder 234 may communicate security information to intermediary device 210. In the embodiment of FIG. 2, responder 234 initiates a secured connection with intermediary device 210 by sending communication 364. Intermediary device 210 may respond with communication 366. In this embodiment, communications 364 and 366 may be in the IKE protocol or any other suitable format.

Regardless of the specific format used to exchange information used to establish a secured connection, secured connection 368 is established between responder device 234 and intermediary device 210. Responder device 234 may use secured connection 368 to communicate security information about secured connection 254 to intermediary device 210.

Intermediary device 210 may use the security information to access communications sent through secured connection 254. Accordingly, secured connection 254 may be treated as if it has two segments, 254A and 254B, with intermediary device 210 able to access packets at the junction between these segments. As in the embodiment of FIG. 2, in the embodiment of FIG. 3 intermediary device 210 may access packets as they are sent through secured connection 254. Access by intermediary device 210 may involve reading encrypted information or modifying authenticated information, then forwarding the modified information to its intended recipient signed using the security information so that its intended recipient will recognize it as a communication through secured connection 254.

Figure 4:
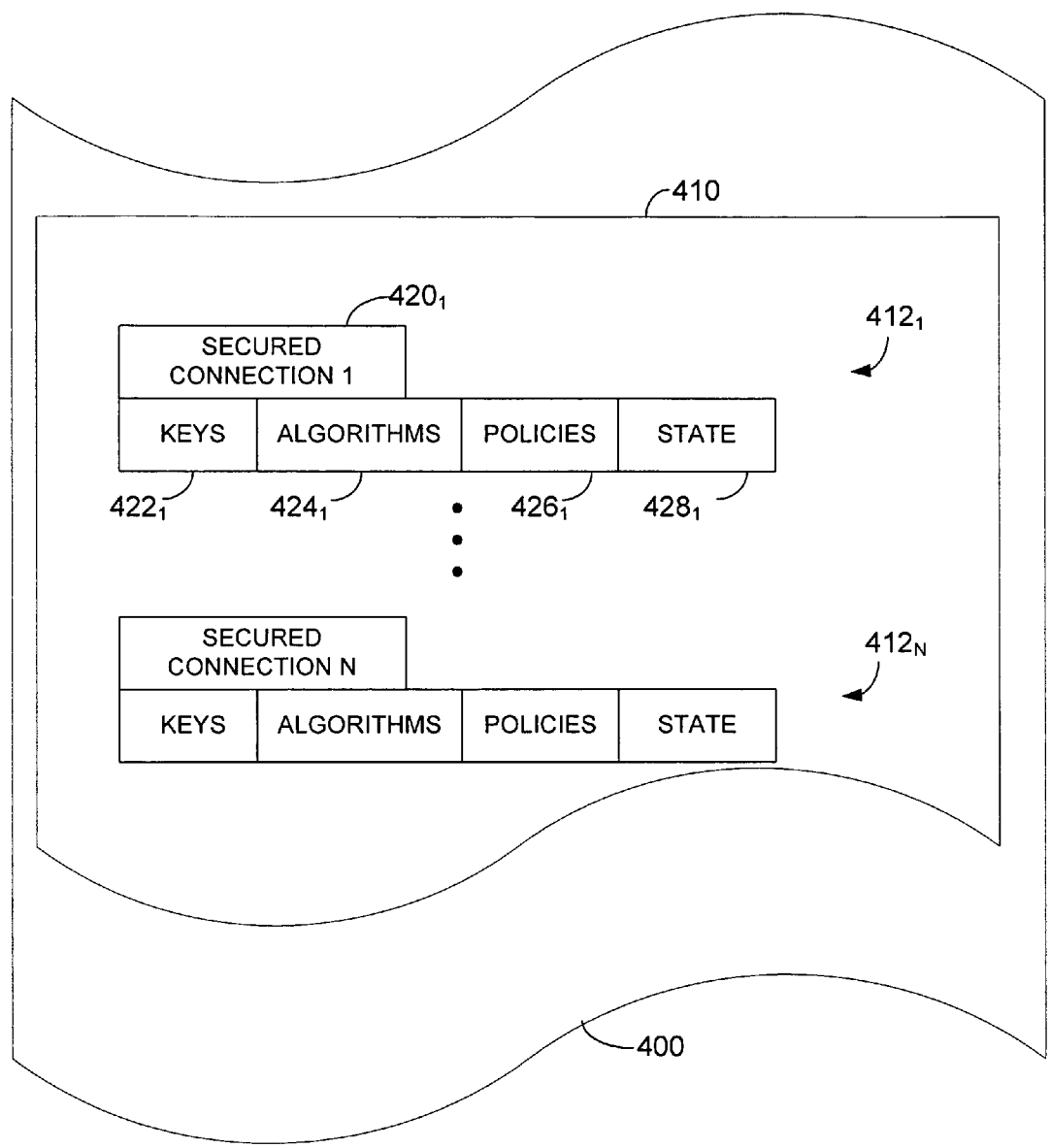
FIG. 4 is a sketch of a data structure maintained by a trusted intermediary device according to an embodiment of the invention.

In the network setting, a device may serve as an intermediary device in multiple secured connections. For example, in the network configuration of FIG. 1, router 110 may serve as an intermediary device for secured connections between device 134 and device 116, device 118, or server 114. Further, more than one secured connection may be formed between the same two devices if there is more than one endpoint in either of the devices. Accordingly, an endpoint, such as router 110, may form a data structure holding information about each of the secured connections for which router 110 serves as a trusted intermediary device. FIG. 4 illustrates such a data structure that may be formed by an intermediary device. The data structure may be formed in a computer-readable medium 400 of any suitable type.

In the embodiment of FIG. 4, data structure 410 includes multiple records $412_1 \ldots 412_N$. Each of the records $412_1 \ldots 412_N$ stores security information about a secured connection. Data structure 410 may be stored in computer-readable media associated with an intermediary device and may be created in any suitable way. For example, data structure 410 may be implemented as part of a database, stored in an XML file, stored in a routing table in RAM on a network interface card or created in any other suitable way.

In the embodiment of FIG. 4, each of the records $412_1 \ldots 412_N$ contains the same types of fields, though each record may store information in any suitable form. Further, FIG. 4 shows each field as a unitary structure. However, each field may actually contain one or more subfields so that each field may store multiple pieces of information.

Taking record $412_1$ as illustrative, each record contains an identification field $420_1$. Field $420_1$ may store information that allows an intermediary device to identify packets of information associated with a specific secured connection. In an embodiment in which a secured connection is formed using the IPsec protocol, field $420_1$ may store a security parameters index (SPI), which is a parameter defined in the IPsec protocol and included in packets transmitted using that protocol. An SPI provides a simple mechanism for an intermediary device to identify packets associated with a specific secured connection. However, other forms of information may alternatively or additionally be stored in identification field $420_1$. For example, identification field $420_1$ may store parameters of a secured connection such as a source address, a destination address, a source port and a destination port. In IPsec, such a data structure is stored at each end point for each connection and is referred to as a SA (Security Association). However, different or additional information may be stored.

Each of the other fields in record $412_1$ contains information about the secured connection identified by the value in identification field $420_1$. In the embodiment of FIG. 4, record $412_1$ also includes a key field $422_1$. Field $422_1$ may store one or more keys used in encrypting, decrypting signing, authenticating or otherwise cryptographically processing information transmitted through the secured connection identified by identification field $420_1$.

Field $422_1$ may store a single key used for all communications between endpoints in the secured connection. Alternatively, field $422_1$ may contain multiple keys, such as separate keys used for encryption or decryption or separate keys used by each endpoint. In embodiments in which different keys are used for different types of communications through the secured connection, multiple keys may be stored in field $422_1$. For example, separate keys may be used for authenticating packets and for encrypting packets.

In some instances, an intermediary device will receive security information that represents only a subset of the information exchanged between endpoints of a secured connection. Accordingly, field $422_1$ may store only those keys of the secured connection provided to intermediary device, which may be a subset of the keys used in the secured connection.

In addition, record $412_1$ includes an algorithm field $424_1$. Some security protocols define the algorithms for the cryptographic functions used to encrypt or sign packets. In other protocols, the endpoints of a secured connection may select the specific algorithms used for signing or encrypting information. In such embodiments, the security information provided to an intermediary device may include an identification of the algorithms used by the endpoints.

Record $412_1$ also includes policy field $426_1$. In some security protocols, different policies may be employed in different secured connections. For example, different connections may employ different levels of security even though the same protocol is used. One secured connection may employ only authentication but another secured connection may employ encryption. Yet another may employ both authentication and encryption. Other levels of security may be possible and the level of security may vary from packet-to-packet based on the nature of each packet. The policies establishing the level of security or other characteristics of each packet may be stored in field $426_1$.

Record $412_1$ also includes state field $428_1$. Devices communicating over a secured connection may maintain one or more pieces of state information about the connection. To send or receive packets over the secured connection, a device may need to use the state information. For example, each device may maintain one or more counters that provide a series of sequence numbers that are attached to packets as they are sent. The recipient device may maintain corresponding counters such that the recipient may appropriately order packets even if delays in transmission or other network problems cause the packets to be received in an order different than the order in which they were sent. Sequence numbers may also enable a recipient device to identify whether it has missed a packet that was transmitted.

For an intermediary device to access packets transmitted over a secured connection, the intermediary device may require its own copy of the counters or other state information used in the secured connection. Upon receipt of security information allowing the intermediary device to access a secured connection, the intermediary device may store the values of those counters or other state information in field $428_1$. As the intermediary device monitors network traffic through the secured connection, it may update the state information stored in field $428_1$.

Record $412_1$ provides one example of the information that may be stored by an intermediary device concerning one secured connection. Similar information may be stored for each secured connection that the intermediary device may access. Accordingly data structure 410 may have a size that depends on the number of secured corrections for which it acts as an intermediary device.

Figure 5:
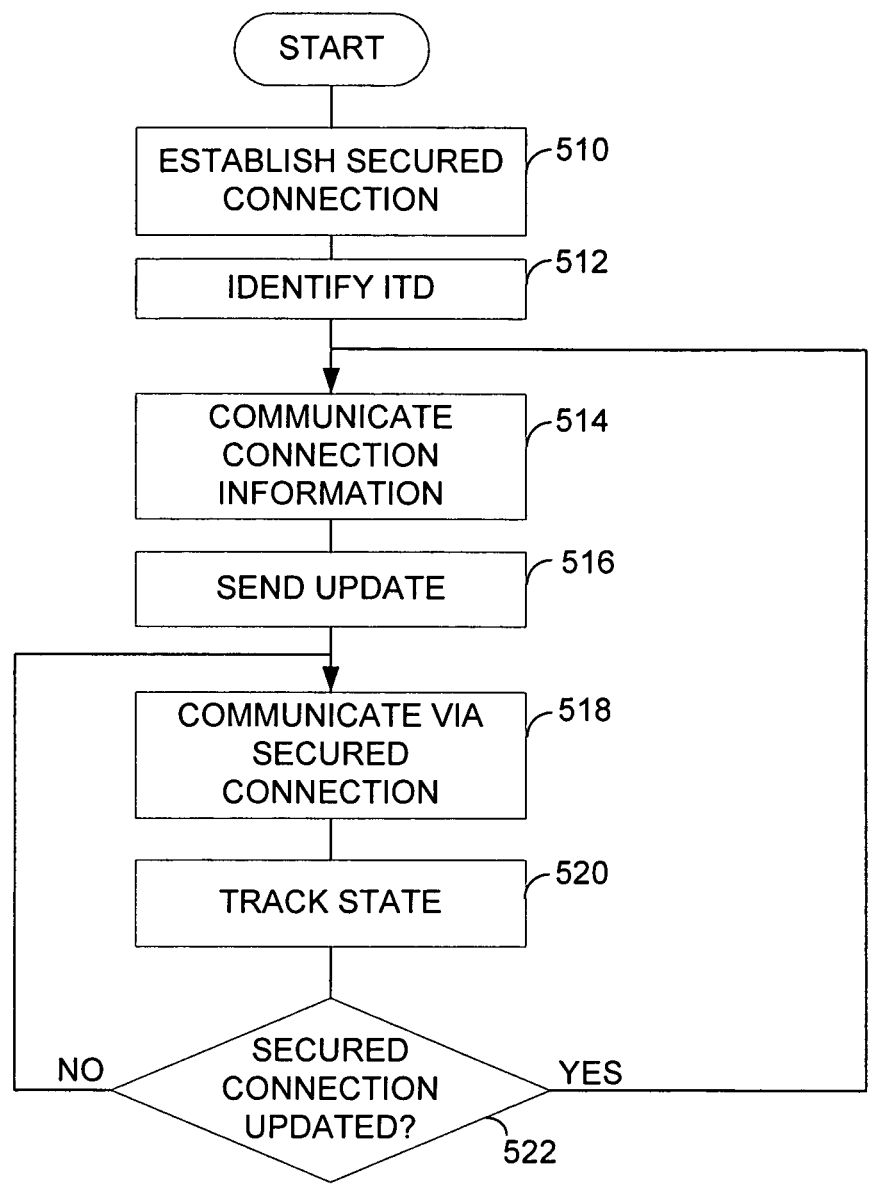
FIG. 5 is a flowchart of a process of providing security information to a trusted intermediary device according to an embodiment of the invention.

An intermediary device may obtain information stored in data structure 410 in any suitable way. FIG. 5 represents a flow chart of a process by which an intermediary device may obtain security information about a secured correction. The process may be performed under the control of computer-executable instructions and/or under control of hardware components, or in any other suitable way.

The process begins at block 510 where a secured connection is established between two endpoints. The secured connection may be established in any suitable way, such as by using the IKE protocol for IPsec communications.

The process proceeds to block 512 where a trusted intermediary device is identified by one or more of the end points to the secured connection. The intermediary device may be identified by communication from a trusted server or from information that may be verified, such as through the use of a certificate.

Regardless of how the trusted intermediary device is identified, processing proceeds to block 514, which is the start of a sub-process by which information about the secured connection is communicated to the intermediary device. The specific information communicated may depend on the protocol used to establish the secured connection. In an embodiment in which the secured connection is established using the IPsec protocol, the information may include some of all of the following items:

[CONST] (information that does not change during the life of the connection)
  LocalPort: if this is zero it means any port (i.e. a wildcard port)
  RemotePort: if this is zero it means any port (i.e. a wildcard port)
  LocalIPAddr—Local IP address
  RemoteIPAddr—Remote IP address
  Protocol: If this is zero it means any (i.e. wildcard). If protocol=0 then local and remote port will also be zero.
  Flags
    DynamicSA: Does this SA rekey, or is it a manual SA.
    InfiniteLife—Infinite Lifetime
    Flags for Inbound SAs
      InBoundAHReplay—AH replay check is enabled.
      InBoundESPReplay—ESP replay check is enabled.

[CACHED] (information that is changed during the life of the connection and is maintained by the end point and communicated to the intermediary trusted device)
  Opcode—used for OffloadUpdates to specify add/delete/overwrite semantics.
    None—used by all offload calls except for UpdateOffload
    Add this SA
    Replace OLD_SPI SA with this SA
    Delete this SA
  OldSPI—only valid if the opcode was Replace. If valid:
    If the old SA has AH enabled, OldSPI is the AH SPI
    Else OldSPI is the ESP SPI
  Flags
    InboundSA—cleared for an outbound SA, set for an inbound SA.
    EnableAH—AH is enabled
    EnableESPConf—ESP conf is enabled
    EnableESPInt—ESP integrity enabled
  KbytesSoft—Number of kilobytes to soft expiration
  KbytesHard—Number of kilobytes to hard expiration
  PacketsSoft—Number of packets to soft expiration—used to ensure that the sequence number does not wrap.
  PacketsHard—Number of packets to hard expiration
  AH parameters (valid if EnableAH flag is set):
    AHSPI
    AHAlgorithm—AH Integrity algorithm—{MD5, SHA1, SHA-256, SHA-384, SHA-512, proprietary1}
    AHKeyLength—AH integrity key length
    AHKey—AH integrity key
  ESP parameters (valid depending on ESP conf/integrity flags)
    ESPSPI
    ESPIntAlgorithm—ESP integrity Algorithm—{MD5, SHA1, SHA-256, SHA-384, SHA-512, proprietary1}
    ESPIntKeyLength—ESP integrity key length
    ESPIntKey—ESP integrity key
    ESPConfAlgorithm—ESP confidentiality algorithm—{DES, 3DES, AES-128, AES-192, AES-256, proprietary1}
    ESPBlockLength
    ESPConfiKeyLength—ESP confidentiality key length
    ESPConfKey—ESP confidentiality key
    OutBoundidleInterval. Outbound idle interval—Used to initiate re-key if the last time an outbound packet was seen on this SA was at least as much time before now. Used by NLBS.

[DELEGATED] (information that will be maintained by the intermediary trusted device and may be communicated back to the end point)
  Flags
    Valid—the SA is currently valid. Can be reset because of hitting a hard limit or as a result of the host Offload-Invalidate command.
  CurrentBytes: Number of bytes transferred over this SA.
  CurrentidleTime: Number of ticks the SA has been idle.
  CurrentConfBytes: Number of confidential bytes transferred over the SA.
  CurrentAuthBytes: Number of auth bytes transferred over the SA.
  Union of Inbound/Outbound Parameters
    Outbound
      AH parameters (valid if EnableAH flag is set):
        LastPacketNum—Sequence number of last AH packet sent over this SA.
      ESP parameters (valid depending on ESP conf/integrity flags):
        CurrentIV—Current Initialization Vector.
        LastPacketNum—Sequence number of last ESP packet sent over this SA.
    Inbound
      AH parameters (valid if EnableAH flag is set):
        CurrentReplayMap—Current AH replay bit map.
        CurrentReplaySeq—Current AH replay last sequence number.
      ESP parameters (valid depending on ESP conf/integrity flags):
        CurrentReplayMap—Current ESP replay bit map
        CurrentReplaySeq—Current ESP replay last sequence number In the embodiment of FIG. 5, information is communicated in a two-step process, sometimes referred to as a "knife edge" transfer. That transfer is performed by processing at blocks 514 and 516. At block 514, information about the secured connection established at block 510 is transferred. The information transferred at block 514 may be only static information, i.e., that information that is unlikely to change during the process of transferring information, or it may include all information about the connection to be transferred to the intermediary device. The amount of information transferred to block 514 may be sufficiently large that enough time passes between the initiation of the transfer of information and the completion of that transfer that the state of the secured connection may change during the transfer.

Accordingly, the information transfer process may include a second step, performed at block 516. At block 516 an update of the connection information is sent to the intermediary device. The information sent at block 516 may include only that information that changed during the processing performed at block 514. Alternatively, information transferred to block 516 may include state information or other similar dynamic information that is likely to have changed or could have changed during processing at block 514. Regardless of the specific criteria used to select information conveyed at block 516, the intermediary device may use the information received at block 516 to update the information stored, such as in a data structure 410, on the secured connection.

Thereafter, processing proceeds to block 518 where the endpoints to the secured connection may communicate using the secured connection. At block 520, the intermediary device tracks the state of the secured connection by monitoring packets transmitted through the secured connection. For example, the intermediary device may update sequence information based on packets it sees transmitted through the secured connection or take any other action that an endpoint may take to maintain state information on a secured connection.

The process then proceeds to decision block 522 where the process branches based on whether the endpoints of the secured connection have updated the secured connection. In some protocols, the security information that defines a secured connection may be modified, either on a periodic basis or in response to defined events. If, as determined at decision block 522, the security information defining the secured connection has changed, processing loops back to block 514. The process may be triggered to loop back to block 514 based on an indication provided by an endpoint that the connection has been updated. Alternatively or additionally, the intermediary device may determine that the connection has been updated from monitored network traffic or in any other suitable way. Regardless of how the system determines that an update is required, the transfer of information defining the secured connection to the intermediary device performed at blocks 514 and 516 is then repeated. Thereafter, the process proceeds to block 518 and block 520 where the endpoints communicate through the secured connection and the intermediary device tracks the state of the connection based on the packets that pass through the secured connection.

Alternatively, if as determined at decision block 522, the secured connection has not been updated, processing loops back to blocks 518 and 520 where the intermediary device continues to monitor communications through the secured connection using previously transmitted connection information.

Figure 6:
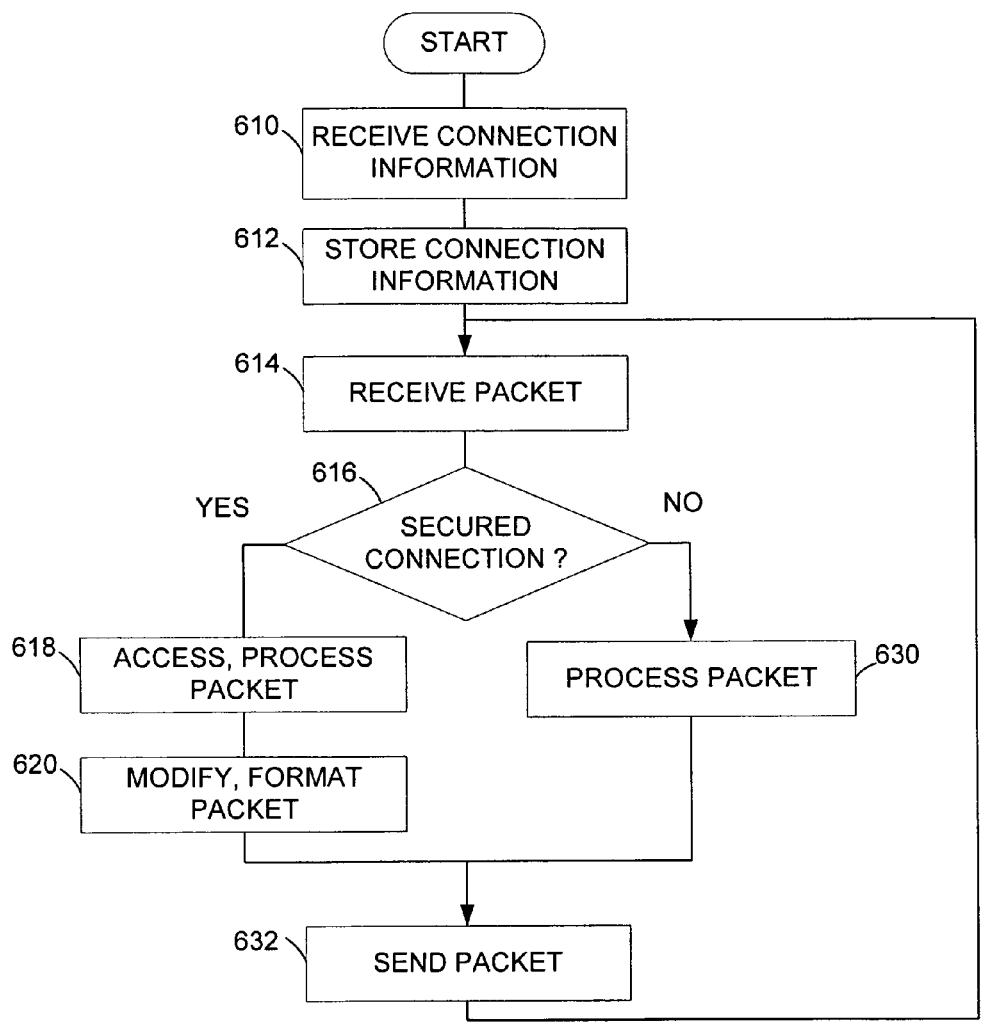
FIG. 6 is a flowchart of a process of operating a trusted intermediary device according to an embodiment of the invention.

The intermediary device may process information obtained by monitoring network traffic over the secured connection in any suitable way. FIG. 6 shows a process by which an intermediary device may process data for one connection. The processing of FIG. 6 may be performed under the control of computer-executable instructions and/or under the control of hardware components or in any other suitable way.

The process of FIG. 6 begins at block 610 where the intermediary device receives connection information. The information received at block 610 may be in the form stored in record 412, (FIG. 4) or may be in any other suitable form. The information may be received according to the process of FIG. 5 or in any other suitable way. In the described embodiment, the connection information received at block 610 allows the intermediary device to both monitor and access packets transmitted through a secured connection.

At block 612, the connection information received at block 612 is stored. The information may be stored in a data structure, such as data structure 410 (FIG. 4). However, any suitable form may be used for storing connection information.

Once the intermediary device has received and stored connection information allowing it to monitor and access packets transmitted through a secured connection, processing proceeds to block 614. At block 614, the intermediary device receives a packet transmitted through the secured connection. In the described embodiment, the intermediary device is a device in the path between the endpoints to the secured connection. Accordingly, the intermediary device may receive packets from either endpoint of the connection.

In such an embodiment, neither the intermediary device nor either of the endpoints is required to take any special actions to cause the intermediary device to receive packets transmitted through a secured connection. However, in other embodiments, either or both of the endpoints may modify the parameters used to transmit packets through the secured connections to insure that each packet is routed along a path containing the intermediary device. In other embodiments, the intermediary device may be implemented as multiple distributed devices, with a device positioned along each possible path that a packet between the endpoints could take. These distributed devices could share information about network traffic to collectively perform the same functions as a single device that receives all network traffic sent through a secured connection. For example, if network redundancies allow packets transmitted through a secured connection to pass through any one of multiple routers, those routers may be configured to share security information about the secured connection and share information about the packets transmitted through a secured connection. Such distributed devices may collectively be regarded as an intermediary device.

Once the intermediary device receives a packet, processing proceeds to decision block 616. At decision block 616, the process branches based on whether the packet received at block 614 was communicated over a secured connection being monitored by the intermediary device.

If the received packet is not transmitted as part of a secured connection, processing proceeds to block 630 where the packet is processed according to the normal function of the intermediary device. For example, if the intermediary device is a router, normal processing of the packet at block 630 may involve identifying a gateway through which to transmit the packet such that it is likely to reach its intended destination. Processing may also include modifying the packet before transmitting, such as occurs when network address translation is used. Other types of devices acting as intermediary devices may perform different types of processing at step 630. For example, if the intermediary device is a firewall, processing at block 630 may involve filtering packets based on source, destination or content. Regardless of the processing performed at block 630, the process then proceeds to block 632 where the packet, as processed at block 630, is transmitted so that it reaches its intended destination.

Conversely, if, as determined at decision block 616, the received packet is transmitted as part of a secured connection being monitored by the intermediary device, the process branches to block 618. At block 618, the intermediary device accesses the received packet. The specific processing involved in accessing the packet may depend on the nature of the packet and the function of the intermediary device. However, as used herein, "accessing" the packet at block 618 involves application of the security information stored about the secured connection through which the received packet was transmitted. Accessing a packet at block 618 may involve decrypting packets that contain encrypted information. Alternatively or additionally, accessing the packet at block 618 may involve using the security information to authenticate the sender of the packet. As a further alternative, accessing at block 618 may involve formatting a packet that is forwarded to the intended destination of the received packet in a format that the intended recipient will accept as a packet that was transmitted by an authorized sender through the secured connection. In such a scenario, accessing a packet at block 618 may entail attaching a signature of an authorized sender of a packet or performing other steps. For example, for a secured connection formed using IPsec, the packet may be signed using the Authentication Header protocol. A signature may be generated using security information provided by an endpoint of the secured connection and may duplicate a signature that would have been generated by an endpoint transmitting the packet.

Regardless of the specific method of access performed at block 618, processing may proceed to block 620. At block 620, the packet may be modified. In this example, block 620 represents an optional processing step. Further, block 620, though shown to follow sequentially after access at block 618, may be performed concurrently with accessing the packet at block 618. For example, in scenarios in which the received packet is signed by an authorized sender, accessing the packet at block 618 may entail regenerating a signature of the authorized sender and may not be completed until after the packet is modified at block 620. Accordingly, the order of steps shown should be regarded as exemplary rather than limiting.

The specific steps taken in modifying the packet at block 620 may depend on the nature of the packet as well as the function of the intermediary device. For example, the packet may be modified in a device that performs network address translation or port address translation. Such operations may alter only the header portion of the packet. However, modification at block 620 need not be limited to modifications of the packet header. The payload or other portion of the packet may be modified at block 620.

Further, modification may include filtering that may result in suppressing retransmission of the received packet. For example, the intermediary device may examine the data of the packet or a sequence of packets and determine that such packets are communicating harmful data, such as data constituting a file with a virus or a request for data from an unauthorized location. The intermediary device may drop such packets or otherwise respond in a way that causes a transaction involving those packets to fail.

Regardless of how the packet is modified, once modified, the packet may be reformatted for transmission over the secured connection to its intended recipient. The specific steps taken in reformatting the packet may depend on the nature of the secured connection as well as the nature of the packet. For example, some or all of the packet may be encrypted and some or all of the packet may be signed.

Regardless of the specific steps taken to prepare the packet for retransmission, processing proceeds to block 632. At block 632, one or more packets are transmitted to an intended recipient as a response to the received packet and processing loops back to block 614 where another packet may be received and similarly processed. The packet transmitted at block 632 may be the same packet received at block 614 or may be a modified version of the packet.

However, the invention is not limited to processing that involves forwarding packets through the secured connection. Once access to a packet is gained, the intermediary device may process the content and generate any one or more packets in response. The response packets may be transmitted through the secured connection, but the manner in which the response is generated is not a limitation on the invention.

As one example, the intermediary device may act as a web cache server. As the intermediary device access packets, it may identify a packet as a request for a web page that has recently been provided to another device and is therefore cached on the server. The intermediary device may respond to the sender of the packet with the cached copy of the requested webpage. The response may be through the secured connection, but may not be in circumstances where the response does not require security. Such a function may be useful, for example, in a network as shown in FIG. 1 in which multiple network users may periodically wish to access the same information.

Processing at block 632 may be selectively omitted. For example, if modifications at block 620 result in a determination that no packet should be forwarded to the intended recipient, processing at block 632 may be omitted.

Processing may proceed iteratively in this fashion with the intermediary device processing multiple packets as the endpoints communicate. Such packet processing may be used to perform any of a number of network functions. For example, accessing the packets at block 618 may entail collecting statistics on network traffic based on information obtained from received packets. However, once access is obtained to the packets transmitted through the secured connection, any desired function may be implemented, including functions that involve modifying the packet before retransmitting the modified packet to an intended recipient.

Having thus described several aspects of at least one embodiment of this invention, it is to be appreciated that various alterations, modifications, and improvements will readily occur to those skilled in the art.

For example, secured connections are illustrated by embodiments in which connections are formed between two devices. While many secured connections are formed between only two devices, the invention is not limited to use in connection with such connections and may be employed in any type of secured connection.

Further, embodiments described above include an intermediary device receiving security information from one endpoint of a secured connection. In other embodiments, an intermediary device may receive security information from multiple endpoints. Also, a secured connection is described to be formed by applying cryptographic functions to packets or messages. The underlying format of the information to which the cryptographic functions is applied is not a limitation of the invention and embodiments may be formed that operate on datagrams of any type. Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface including keyboards, and pointing devices, such as mice, touch pads, and digitizing tables. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a device for processing packets associated with communication through a secured connection between a first device and a second device, the method comprising:
    a) receiving from the first device security information defining the secured connection and counter information associated with a state of the secured connection;
    b) tracking, in a counter in the device for processing packets, state information for the secured connection based on the received counter information, a value of the counter defining the tracked state information;
    c) receiving at least one packet containing encrypted information from the second device sent to the first device;
    d) accessing the at least one packet using the security information and tracked state information obtained from the tracking of the state information for the secured connection, the accessing comprising forming a modified packet from the at least one packet and using the security information to format the modified packet to pass through the secured connection without disrupting the secured connection, the modified packet differing from the at least one packet in at least one portion, the using the security information to format the modified packet further comprising:
       d1) using the security information to apply a key of an authorized sender of the at least one packet over at least a portion of the modified packet to generate a signature; and
       d2) attaching the signature to the modified packet; and
    e) sending a communication comprising the formatted modified packet to the first device based on information received in the at least one packet.

2. The method of claim 1, wherein accessing the at least one packet comprises decrypting at least one encrypted portion of the at least one packet.

3. The method of claim 2, further comprising:
    f) generating statistics related to communication on a network to which the first device and the second device are connected, the statistics reflecting communication between the first device and the second device based on the at least one decrypted portion of the packet.

4. The method of claim 2, wherein:
    i) accessing the at least one packet comprises identifying the at least one packet as a request for a web page that is cached by the device for processing packets; and
    ii) sending, by the device for processing packets, a communication comprising a copy of the cached web page.

5. The method of claim 1, wherein:
    iii) forming a modified packet comprises forming a modified packet using network address translation; and
    iv) formatting the modified packet comprises forming a packet using an Authentication Header protocol.

6. The method of claim 1, wherein accessing the at least one packet comprises performing a virus check on data conveyed in the at least one packet.

7. The method of claim 1, wherein the accessing at least one packet further comprises:
    using a decryption key included in the security information to decrypt the encrypted information included in the at least one received packet; and
    encrypting the formatted modified packet including the attached signature before performing the step e, an encryption key for performing the encrypting being included in the security information, wherein the key of the authorized sender of the at least one packet is applied to at least a portion of the decrypted encrypted information to generate the signature.

8. A device for processing packets associated with communications through secured connections over a network, the device comprising at least one computer-readable medium having stored thereon:
   a) a data structure comprising a plurality of fields, wherein each field of the plurality of fields includes security information defining a secured connection established between devices communicating over the network, and wherein each field of the plurality of fields also includes at least one subfield for storing a value of at least one counter defining a state of the secured connection; and
   b) computer-executable instructions for:
      identifying a received packet containing encrypted information for an identified secured connection;
      monitoring, by the device for processing packets, packets exchanged in an identified secured connection;
      updating the value of the at least one counter stored in the at least one subfield as an updated definition of the state of the identified secured connection based on counter information from the received packet;
      iii) accessing the received packet using the security information from an associated field in the data structure that holds the security information for the identified secured connection and updating the value of the at least one counter stored in the at least one subfield as an updated definition of the state of the identified secured connection, wherein the accessing comprising forming a modified packet from the received packet and using the security information to format the modified packet to pass through the secured connection for the identified secure connection without disrupting the secured connection, the modified packet differing from the received packet in at least one portion, the using the security information to format the modified packet further comprising:
         iii-a) using the security information to apply a key of an authorized sender of the received packet over at least a portion of the modified packet to generate a signature; and
         iii-b) attaching the signature to the modified packet; and
      iv) sending a communication comprising the formatted modified packet in response to the received packet.

9. The device of claim 8, further comprising computer-executable instructions for updating the counters in the data structure in response to packets received over the network.

10. The device of claim 8, further comprising computer-executable instructions for receiving, for each field, the security information defining the identified secured connection from a device that is an endpoint of the identified secured connection.

11. The device of claim 8, wherein the device is a router.

12. The device of claim 8, wherein the device is a firewall.

13. A computer readable memory having instructions stored therein for causing a device for processing packets to perform operations, the device for processing packets being associated with communication through a secured connection between a first device and a second device, the operations comprising:
   receiving from the first device security information defining the secured connection and counter information associated with a state of the secured connection;
   tracking, in a counter in the device for processing packets, state information for the secured connection based on the received counter information, a value of the counter defining the tracked state information;
   receiving at least one packet containing encrypted information from the second device sent to the first device;
   accessing the at least one packet using the security information and tracked state information obtained from the tracking of the state information for the secured connection, the accessing comprising forming a modified packet from the at least one packet and using the security information to format the modified packet to pass through the secured connection without disrupting the secured connection, the modified packet differing from the at least one packet in at least one portion, the using the security information to format the modified packet further comprising:
      using the security information to apply a key of an authorized sender of the at least one packet over at least a portion of the modified packet to generate a signature; and
      attaching the signature to the modified packet; and
   sending a communication comprising the formatted modified packet to the first device based on information received in the at least one packet.

14. The computer readable memory of claim 13, wherein accessing the at least one packet comprises decrypting at least one encrypted portion of the at least one packet.

15. The computer readable memory of claim 14, wherein the operations further comprise:
   generating statistics related to communication on a network to which the first device and the second device are connected, the statistics reflecting communication between the first device and the second device based on the at least one decrypted portion of the packet.

16. The computer readable memory of claim 14, wherein:
   accessing the at least one packet comprises identifying the at least one packet as a request for a web page that is cached by the device for processing packets; and
   sending, by the device for processing packets, a communication comprising a copy of the cached web page.

17. The computer readable memory of claim 13, wherein:
   forming a modified packet comprises forming a modified packet using network address translation; and
   formatting the modified packet comprises forming a packet using an Authentication Header protocol.

18. The computer readable memory of claim 13, wherein accessing the at least one packet comprises performing a virus check on data conveyed in the at least one packet.

19. The computer readable memory of claim 13, wherein tracking the state information includes:
   updating the counter in response to packets received over a network.

20. The computer readable memory of claim 13, wherein the accessing at least one packet further comprises:
   using a decryption key included in the security information to decrypt the encrypted information included in the at least one received packet; and
   encrypting the formatted modified packet including the attached signature, an encryption key for performing the encrypting being included in the security information, wherein
   the key of the authorized sender of the at least one packet is applied to at least a portion of the decrypted encrypted information to generate the signature.

* * * * *